United States Patent
Huang

(10) Patent No.: US 7,847,858 B2
(45) Date of Patent: Dec. 7, 2010

(54) SYSTEM AND METHOD FOR CONTROLLING PHOTOFLASH

(75) Inventor: Chun-Chieh Huang, Taipei Hsien (TW)

(73) Assignee: Hon Hai Precision Co., Ltd., Tu-Cheng, Taipei Hsien (TW)

( * ) Notice: Subject to any disclaimer, the term of this patent is extended or adjusted under 35 U.S.C. 154(b) by 493 days.

(21) Appl. No.: 11/946,273

(22) Filed: Nov. 28, 2007

(65) Prior Publication Data
US 2008/0303938 A1 Dec. 11, 2008

(30) Foreign Application Priority Data
Jun. 7, 2007 (CN) .................... 2007 1 0200783

(51) Int. Cl.
*H04N 5/222* (2006.01)
(52) U.S. Cl. .................. 348/370; 348/371; 348/373; 348/374; 348/375; 348/376
(58) Field of Classification Search ................ 348/370, 348/371, 373–376; 396/61, 62, 155, 171, 396/173, 176–181; 358/417; D16/209, 239
See application file for complete search history.

(56) References Cited

U.S. PATENT DOCUMENTS

| 5,581,315 A | 12/1996 | Ishiguro |
| 6,753,920 B1 * | 6/2004 | Momose et al. ............. 348/371 |

FOREIGN PATENT DOCUMENTS

| CN | 1811577 A | 8/2006 |
| CN | 2836119 Y | 11/2006 |

\* cited by examiner

*Primary Examiner*—Yogesh K Aggarwal
(74) *Attorney, Agent, or Firm*—Jeffrey T. Knapp

(57) ABSTRACT

A system for controlling photoflash includes a signal processing unit, a calculating unit, a photoflash module and an adjusting unit. The photoflash module includes a capacitor. The signal processing unit is configured for analyzing image information to get a current brightness value of the image, and the calculating unit is configured for calculating a first photoflash time of the photoflash module based on a first voltage value of the capacitor via analyzing the current brightness value. The adjusting unit is configured for adjusting the first photoflash time to get a second photoflash time according to a second voltage value of the capacitor, and outputting the second photoflash time to the photoflash module to control flashing of the photoflash module.

6 Claims, 3 Drawing Sheets

SYSTEM AND METHOD FOR CONTROLLING PHOTOFLASH

TECHNICAL FIELD

The present invention relates to photoflash control systems configured for digital products and, especially to a system and method for controlling photoflash for providing enough light during an image capturing process.

BACKGROUND

With the ongoing development of technology, digital products, such as digital cameras, PDAs, or digital video cameras, have become more widely used. In poor light conditions, such as on a cloudy day, a photoflash is necessary to obtain a quality image. The photoflash generally comprises a lamp and a capacitor. When the photoflash is used, the capacitor discharges causing the lamp to flash.

Referring to FIG. 3, a related photoflash apparatus 100 includes a light sensitive element 10 for converting light signals to electrical signals, a signal processor 12 for receiving the electrical signals to output the brightness (Y) information, a comparing unit 14, a calculating unit 16, and a photoflash module 18. The photoflash module 18 includes a lamp 17 and a capacitor 19. The capacitor 19 is discharged to make the lamp 17 flash to provide additional light for the image. The comparing unit 14 is configured for comparing a current brightness value with a predetermined brightness value stored in the comparing unit 14. When the current brightness value is less than the predetermined brightness value, the calculating unit 16 calculates the photoflash time of the photoflash module 18 based on the brightness Y. The calculating unit 16 outputs the photoflash time to control the photoflash module 18.

However, when the calculating unit 16 calculates the photoflash time, the second voltage value of the capacitor 19 is gradually reduced. The photoflash time calculated by the calculating unit 16 is based on a first voltage value of the capacitor 19. However, the capacitor 19 has been discharged to provide additional light. Therefore, the residual voltage of the capacitor 19 is not enough to provide sufficient brightness during the photoflash time.

SUMMARY

In accordance with a present embodiment, a system for controlling photoflash includes a signal processing unit, a calculating unit, a photoflash module and an adjusting unit. The photoflash module includes a capacitor. The signal processing unit is configured for receiving the electrical signals of an image received from a light sensitive element to get a brightness of the image, and the calculating unit is configured for calculating a first photoflash time of the photoflash module according to the brightness value and a first voltage value of the capacitor. The adjusting unit is configured for adjusting the first photoflash time to get a second photoflash time according to a second voltage value of the capacitor after the calculating unit finishing calculating. The second photoflash time is longer than that of the first photoflash time. The second photoflash time is output to the photoflash module to control the photoflash module.

Those and other advantages and novel features will be more readily apparent from the following detailed description set forth below taken in conjunction with the accompanying drawings.

BRIEF DESCRIPTION OF THE DRAWINGS

Many aspects of the present system and method for controlling photoflash can be better understood with reference to the following drawings. The components in the drawings are not necessarily drawn to scale, the emphasis instead being placed upon clearly illustrating the principles of the system and method for controlling photoflash. Moreover, in the drawings, like reference numerals designate corresponding parts throughout the several views.

DESCRIPTION OF EMBODIMENT

An embodiment of the present system and method for controlling photoflash will now be described in detail below with reference to the drawings.

Figure 1:
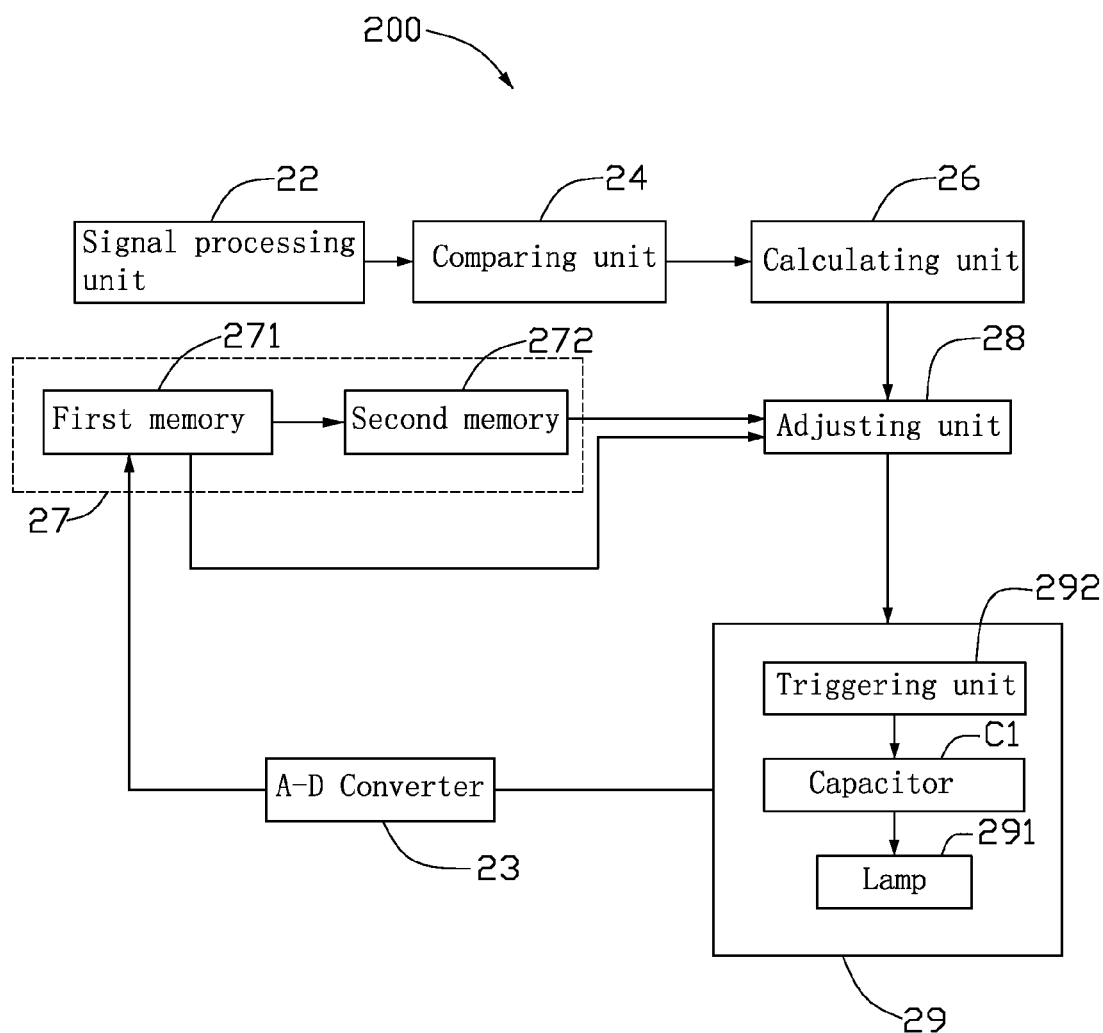
FIG. 1 is a block diagram illustrating some components of a system for controlling photoflash in accordance with a preferred embodiment.

Referring to FIG. 1, a photoflash control system 200, in accordance with a preferred embodiment, includes a signal processing unit 22, an A-D converter 23, a comparing unit 24, a calculating unit 26, a storing unit 27, an adjusting unit 28, and a photoflash module 29.

The signal processing unit 22, the A-D converter 23, the comparing unit 24, the calculating unit 26, the adjusting unit 28, and the photoflash module 29 are electrically connected in series in that order. One end of the storing unit 27 is connected with the adjusting unit 28 and the other end is connected to the photoflash module 29 via the A-D converter 23. The A-D converter 23 is electrically connected in parallel to a lamp 291 of the photoflash module 29 for sampling the voltage value of a capacitor C1 of the photoflash module 29.

The signal processing unit 22 receives the electrical signals of the image transmitted from a light sensitive element (not shown) to get a current brightness value thereof. The comparing unit 24 is configured for comparing the current brightness value with a predetermined brightness value stored in the comparing unit 24 and outputting the current brightness value to the calculating unit 26 when the current brightness value is less than the predetermined brightness value. The calculating unit 26 is configured for calculating a first photoflash time t1 of the photoflash module 29 based on a first voltage value of the capacitor C1 of the photoflash module 29 according to the current brightness value.

The storing unit 27 includes a first memory 271 and a second memory 272. The first memory 271 holds the first voltage value until passing it to the second memory 272 for use in calculating the first photoflash time t1 and is also utilized as a ROM for holding a second voltage value of the capacitor C1 received from the A-D converter 23 after the calculating unit 26 finishes calculating, while the second memory 272 is utilized as a RAM only for storing the first voltage value of the capacitor C1 received from the first memory 271. The adjusting unit 28 adjusts the first photoflash time t1 to get a second photoflash time t2 according to the second voltage value and the first voltage value received from the first memory 271 and the second memory 272 respectively, and thereupon outputs the second photoflash time t2 to the photoflash module 29 to control flashing of the photoflash module 29.

The photoflash module 29 includes the capacitor C1, the lamp 291, and a triggering unit 292 connected in series in that order. The triggering unit 292 receives the second photoflash time t2 of the photoflash module 29 and triggers the capacitor C1 to discharge to control the lamp 291 to emit light.

Figure 2:
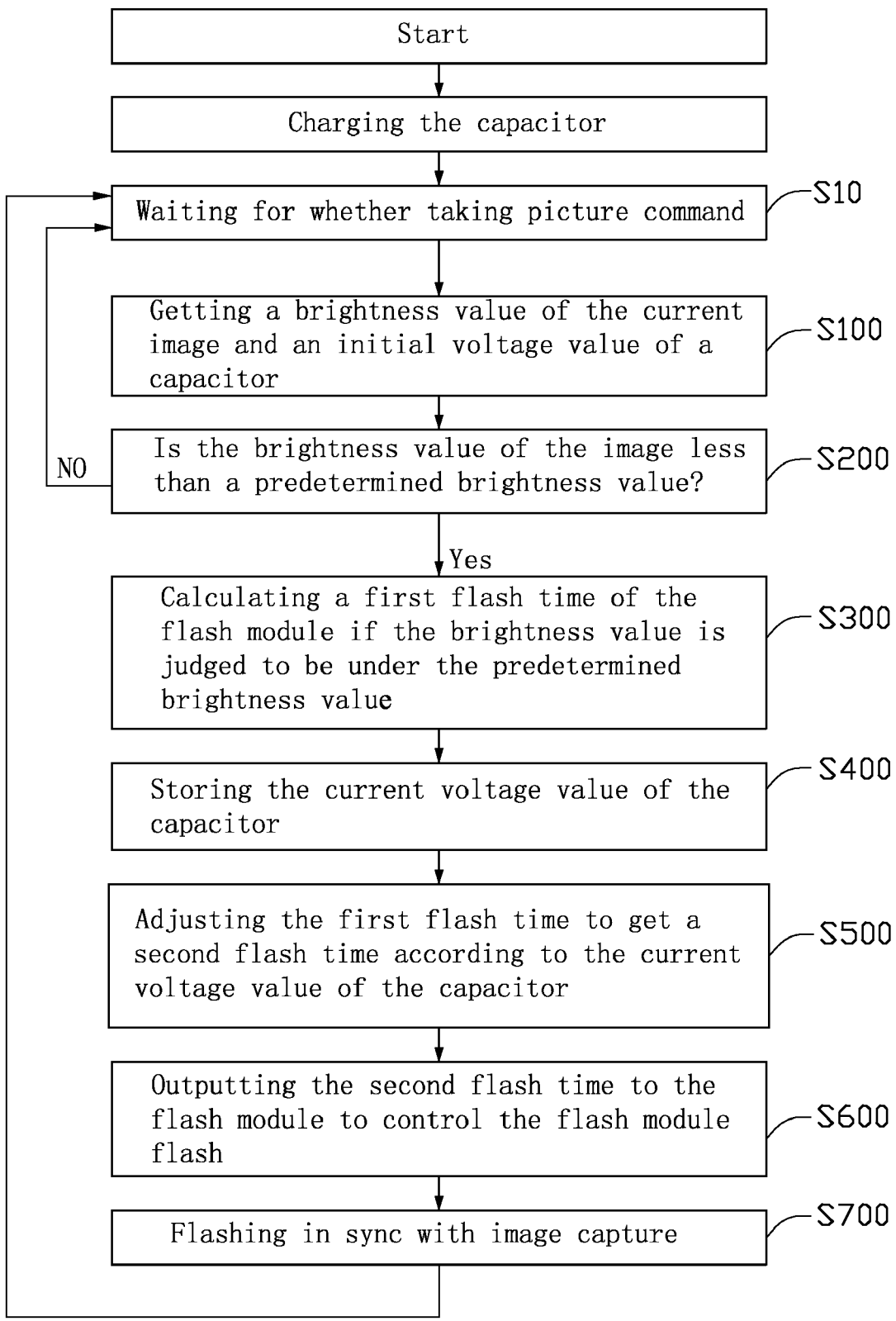
FIG. 2 is a flow chart of a method for controlling photoflash taken in the preferred embodiment.
Figure 3:
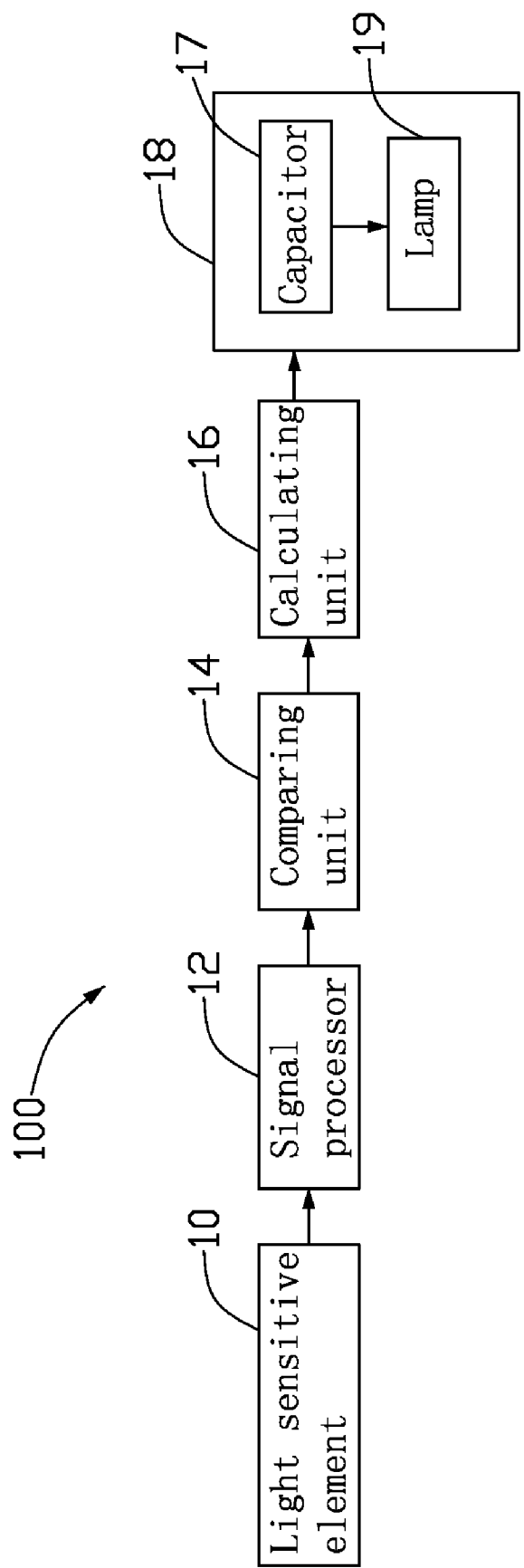
FIG. 3 is a functional chart of a related system for controlling photoflash.

Referring to FIG. 2, a method for a camera using the photoflash control system 200 to control flashing of the photoflash module 29 is also provided. The method includes the following steps. Firstly, the camera is turned on and the photoflash control system 200 is activated, and the capacitor C1 charges. Then, in step S10: the photoflash control system 200 idles waiting for an image capture command (user presses button on the camera to take a picture). Once the command is received, go to step S100.

S100: analyzing image information to obtain a current brightness value of a current image; and the A-D converter 23 obtains a first voltage value U1 and stores it in the first memory 271. S200: judging whether the current brightness value of the image is lower than a predetermined brightness value stored in the comparing unit 24. If yes, go to step S300, if no, return to step S10. S300: calculating a first photoflash time t1 of the photoflash module 29 based on the first voltage value U1 of the capacitor C1 and according to the current brightness value. S400: storing a second voltage value U2 of the capacitor C1 when the calculating unit 26 finishes calculating. S500: adjusting the first photoflash time t1 to get a second photoflash time t2 according to the first voltage value U1 and the second voltage value U2 of the capacitor C1. S600: outputting the second photoflash time t2 to the photoflash module 29 to control flashing of the photoflash module 29. S700: triggering the capacitor C1 to discharge to control the lamp 291 to flash in sync with the camera's image capturing according to the second photoflash time t2. Then return to the step of charging the capacitor C1.

In step S100, the signal processing unit 22 analyzes image information to obtain the current brightness value of the image. The signal processing unit 22 can receive image information from one or more light sensitive elements such as charge coupled devices (CCDs), or complementary metal oxide semiconductors (CMOSs).

In step 200, the comparing unit 24 compares the current brightness value with a predetermined brightness value stored in the comparing unit 24. Further, if the current brightness value of the image is greater than or equal to the predetermined brightness value, the photoflash system 200 is configured to idle (return to step S10 and wait for next command), and the camera takes a picture based on ambient light. If the current brightness value of the image is less than the predetermined brightness value, the photoflash module 29 is configured to activate a routine for providing additional light for the image. At this time, the comparing unit 24 outputs the current brightness value to the calculating unit 26.

In step S300, before the calculating unit 26 calculates, the first voltage value U1 of the capacitor C1 is stored in the second memory 272.

In step S400, the calculating unit 26 calculates a first photoflash time t1 based on the first voltage value U1 of the capacitor C1 according to the current brightness value.

In step 500, the second voltage value U2 is obtained via the A-D converter 23 and stored in the first memory 271. Then the adjusting unit 28 receives the first voltage value U1 of the capacitor C1 stored in the second memory 272, and the second voltage value U2 of the capacitor C1 held in the first memory 271, and adjusts the first photoflash time t1 to get a second photoflash time t2 according to the second voltage value U2 of the capacitor C1 received from the first memory 271. The second photoflash time t2 is obtained by the following described formula A used by the adjusting unit 28, using the references t1, U1 and U2.

$$t2 = t1 + (U1^2 - U2^2)*K \qquad \text{A)}$$

wherein K is a micro-adjusting constant and is in direct proportion to the capacitance of the capacitor C1. After this is performed, in step S600, the second photoflash time t2 is output to the triggering unit 292 of the photoflash module 29 to control the capacitor C1 to discharge, thereby triggering the lamp 291 to flash. After the flashing of the photoflash module 29 is performed, return to the step of charging the capacitor C1.

As stated above, the flash control system and method adjusts the first photoflash time t1 calculated by the calculating unit 26 based on the first voltage value U1 of the capacitor C1 before the calculating unit 26 has performed its calculation to get the second photoflash time t2 based on the second voltage value U2 of the capacitor C1 after the calculating unit 26 has finished calculating via the adjusting unit 28, thereby providing enough light to the image during image capture.

Although the present invention has been described with reference to a particular embodiment, it is not to be construed as being limited thereto. Various alterations and modifications can be made to the embodiment without in any way departing from the scope or spirit of the present invention as defined in the appended claims.

What is claimed is:

1. A system for controlling photoflash, comprising:
   a photoflash module for illuminating an object, the photoflash module including a lamp, a capacitor, and a triggering unit connected in series in that order,
   a signal processing unit configured for analyzing image information of the object to obtain a current brightness value of the image at a first timing at which the capacitor has a first voltage value applied thereto;
   an A-D converter electrically connected in parallel to the lamp;
   a storing unit including a first memory and a second memory;
   a calculating unit configured for calculating a first photoflash time of the photoflash module based on the first voltage value of the capacitor and the current brightness value; and
   an adjusting unit configured for adjusting the first photoflash time to a second photoflash time according to a second voltage value of the capacitor at a subsequent second timing at which the first voltage value of the capacitor is changed into the second voltage value thereof and controlling flashing of the photoflash module according to the second photoflash time;
   wherein the A-D converter is configured for sampling the first voltage value and the second voltage value of the capacitor, the first memory is configured for holding the first voltage value until passing the first voltage value to the second memory for use in calculating the first photoflash time, the first memory is utilized as a ROM for holding the second voltage value of the capacitor received from the A-D converter, the second memory is utilized as a RAM only for storing the first voltage value of the capacitor received from the first memory, and the triggering unit is configured for receiving the second photoflash time of the adjusting unit and triggering the capacitor to discharge to control the lamp to emit light.

2. The system for controlling photoflash as claimed in claim 1, wherein the adjusting unit is configured for adjusting the first photoflash time to the second photoflash time by using a formula $t2=t1+(U1^2-U2^2)*K$, wherein t1 is the first photoflash time, t2 is the second photoflash time, U1 is the first voltage value held in the first memory and then stored in the second memory, U2 is the second voltage value only held in the first memory after being received from the A-D converter, and K is a micro-adjusting constant.

3. The system for controlling photoflash as claimed in claim 2, wherein the micro-adjusting constant K is in direct proportion to the capacitance of the capacitor.

4. The system for controlling photoflash as claimed in claim 1, further comprising a comparing unit configured for storing a predetermined brightness value and comparing the current brightness value with the predetermined brightness value to output the current brightness value to the calculating unit if the current brightness value is lower than the predetermined brightness value.

5. A method for controlling a photoflash module to flash to illuminate an object, the method comprising:

provoding a storing unit, comprising a first memory and a second memory;

analyzing image information to obtain a current brightness value of the image of the object and a first voltage value of a capacitor arranged in a photoflash module;

storing the first voltage value of the capacitor in the first memory of the storing unit;

judging whether the current brightness value of the image is lower than the predetermined brightness value;

calculating a first photoflash time of the photoflash module based on the first voltage value of the capacitor of the photoflash module and the current brightness value;

storing a second voltage value of the capacitor in the first memory of the storing unit when the calculating unit finishes calculating;

adjusting the first photoflash time to a second photoflash time according to the first voltage value and the second voltage value of the capacitor; and outputting the second photoflash time to the photoflash module to control flashing of the photoflash module;

wherein the photoflash module includes the capacitor, a lamp and a triggering unit connected in series in that order, the triggering unit is configured for receiving the second photoflash time and triggering the capacitor to discharge to control the lamp to emit light, the first memory is configured for holding the first voltage value until passing the first voltage value to the second memory for use in calculating the first photoflash time, the first memory is utilized as a ROM for holding the second voltage value of the capacitor, and the second memory is utilized as a RAM only for storing the first voltage value of the capacitor received from the first memory.

6. The method as claimed in claim 5, wherein an A-D converter is electrically connected in parallel to the lamp of the photoflash module for sampling the first voltage value and the second voltage value of the capacitor.

* * * * *